United States Patent [19]
Malik

[11] Patent Number: 6,041,112
[45] Date of Patent: Mar. 21, 2000

[54] METHOD FOR TRANSFERRING SWITCH-BASED INFORMATION TO AN EXTERNAL NETWORK ELEMENT

[75] Inventor: Dale W. Malik, Dunwoody, Ga.

[73] Assignee: BellSouth Intellectual Property Corporation, Wilmington, Del.

[21] Appl. No.: 08/982,652

[22] Filed: Dec. 2, 1997

[51] Int. Cl.[7] .................................................. H04M 3/48
[52] U.S. Cl. ........................ 379/209; 379/207; 379/230
[58] Field of Search .................................... 379/207, 209, 379/201, 219, 220, 221, 229, 230, 265

[56] References Cited

U.S. PATENT DOCUMENTS

| | | | |
|---|---|---|---|
| 5,311,583 | 5/1994 | Friedes et al. | 379/209 |
| 5,430,719 | 7/1995 | Weisser, Jr. | 370/389 |
| 5,471,519 | 11/1995 | Howe et al. | 379/35 |
| 5,479,495 | 12/1995 | Blumhardt | 379/207 |
| 5,590,171 | 12/1996 | Howe et al. | 379/35 |
| 5,600,710 | 2/1997 | Weisser, Jr. et al. | 379/266 |
| 5,661,790 | 8/1997 | Hsu | 379/209 |
| 5,898,769 | 4/1999 | Furman | 379/207 |
| 5,901,359 | 5/1999 | Malmstrom | 379/207 |
| 5,923,744 | 7/1999 | Cheng | 379/207 |

*Primary Examiner*—Scott Wolinsky
*Attorney, Agent, or Firm*—Nora M. Tocups; Kilpatrick Stockton LLP

[57] ABSTRACT

A method for transferring automatic recall-related information from a switch to a service control point for storage and providing the automatic recall-related information to an external network element, such as a service node, for enhanced services, such as automatic recall telecommunications service. Automatic recall service allows a customer to dial a special feature code and receive an enunciation of the directory number of the last incoming caller. Typically, automatic recall-related information is stored in the called party switch and is not accessible to external network elements that may provide enhanced services with this information. This automatic recall-related information may include information such as the directory number of the last incoming caller, the time stamp of the last incoming call, and/or the privacy indicator of the last incoming call. The method includes transferring the automatic recall-related information to an SCP for storage. The external network element that is to provide an enhanced service may request the automatic recall-related information from the SCP. The SCP may then send the automatic recall-related information to the external network element. The external network element may then use the automatic recall-related information to provide enhanced services.

4 Claims, 3 Drawing Sheets

METHOD FOR TRANSFERRING SWITCH-BASED INFORMATION TO AN EXTERNAL NETWORK ELEMENT

FIELD OF THE INVENTION

The present invention generally relates to telecommunications systems, and more particularly, relates to a method for transferring switch-based information to an external network element. The present invention even more particularly relates to a method for transferring automatic recall-related information from a switch to a service control point for storage and for providing the automatic recall-related information to a service circuit node for use with enhanced services. Even more particularly, the present invention relates to a method for providing enhanced services, such as automatic recall service with audible name enhancement and multi-caller logging.

BACKGROUND OF THE INVENTION

Automatic recall service, also known as call return or *69, is a popular service offered by telecommunications service providers. Automatic recall service typically allows a customer to dial a special feature code and receive an enunciation of the telephone number of the last incoming caller. The customer is also typically presented with the option of calling back the directory number associated with the last incoming caller by dialing another special feature code. Thus, a customer may use the automatic recall service to screen his or her calls or when the customer is unable to answer a call before the calling party hangs up. The automatic recall service also may be used when a customer does not know the directory number of that caller, but wants to call back the last incoming caller.

A typical telecommunications network, such as a Signaling System 7 (SS7) network, implements and provides the automatic recall service as described below. When a calling party dials a directory number of a called party, a communication is routed via conventional means to a switch, or signal switching point (SSP), associated with the directory number of the called party. The switch associated with the directory number of the called party may be referred to as the called party switch. When the communication reaches the called party switch, the called party switch stores the directory number of the calling party in a storage location referred to herein as a line history block. The communication received from the calling party may include a privacy indicator and/or a time stamp. A privacy indicator is a flag that indicates whether or not the calling party has marked the communication as private. If the calling party has marked the communication as private, then the switch may not deliver the directory number of the calling party to the called party line. In addition to a privacy indicator, the communication may include a time stamp. A time stamp is an indication of the time and the date that the communication from the calling party was received by the switch. If the communication includes a privacy indicator and/or a time stamp, most automatic recall systems store the privacy indicator and time stamp in the line history block of the called party switch.

Typically, a customer may initiate the automatic recall service by entering a special feature code through the key pad of his or her telephone. The customer may also be referred to herein as the subscriber or called party. Upon receiving the special feature code, the called party switch may locate the stored directory number of the last incoming caller, the stored privacy indicator, and the stored time stamp. The called party switch may then initiate a voice synthesis feature that enunciates the directory number of the last incoming calling party and the time and date of the last incoming call. Typically, the called party switch also provides the option to the subscriber of entering another feature code to automatically call back the directory number of the last calling party. For example, the called party switch, upon receiving the special feature code requesting automatic recall, may enunciate: "Your last call was from 555–1234 at 12:04 PM on Monday, May 4. Please press '1' on your key pad to automatically dial this number."

In a typical automatic recall service, the called party switch examines the privacy indicator before enunciating the directory number of the last incoming caller to the customer. If the privacy indicator denotes that the last incoming caller marked the communication as "private", then the called party switch does not transmit the directory number of the last incoming caller to the customer. If the privacy indicator denotes that the last incoming caller did not mark the communication as "private", then the called party switch transmits the directory number of the last incoming caller to the customer. For example, if the last incoming caller marked the communication as "private", then the called party switch enunciates a message similar to the following message: "Your last call was from a private number at 12:04 PM on Monday, May 4. Please press '1' on your key pad to automatically dial this number."

Although automatic recall service is a convenient and popular service, it does suffer from some drawbacks. One drawback of the automatic recall service is that the information related to the last incoming caller such as the directory number of the last incoming caller, the time stamp, and the privacy indicator, are stored in the line history block of the called party switch. The called party switch may enunciate the calling party's directory number and/or the time and date that the last incoming call was received. In addition, the called party switch determines whether or not the last incoming call was private. However, the called party switch has limited intelligence. Thus, the called party switch cannot perform many enhanced services that are convenient or may be desired by the customer.

For most enhanced services, an intelligent, external network element is required. Using present automatic recall services, there is no means for transferring the automatic recall-related information from a called party switch to an external network element, or external application, so that the external application may use the automatic recall-related information to provide enhanced services, such as audible name enhancement. Audible name enhancement provides a voice enunciation of the name associated with the directory number of the calling party. A telecommunications service provider which can provide enhanced services, such as audible name enhancement, will enjoy a distinct advantage over competitors. Thus, there is a need in the art for a method and system for transmitting the automatic recall-related information to an external network element so that enhanced services may be provided.

Still another drawback of storing automatic recall-related information in a called party switch is that typically only the automatic recall-related information associated with the last incoming caller is stored. Thus, using automatic recall, the called party is only able to identify the last incoming caller. The automatic recall-related information for any callers prior to the last incoming caller is not stored. There is also a need in the art for a method and system for providing automatic recall service that is capable of multi-caller logging, i.e., storing automatic recall-related information for more than one calling party.

SUMMARY OF THE PRESENT INVENTION

Stated generally, the present invention provides a system and method for transferring switch-based information to an external network element so that enhanced services may be provided. The present invention is a method for storing switch-based information in a service control point to provide an external network element with access to the switch-based information. A packet is generated to indicate that a communication in association with a subscriber line functionally connected to the switch has been received. The packet is sent to the service control point and, in response to receiving the packet, the SCP sends a return packet to the switch to continue processing the call.

The present invention is a method for providing automatic recall-related information to an external network element, wherein the automatic recall-related information is stored in a service control point. An external network element sends a request for the automatic recall-related information to the service control point. The service control point retrieves the automatic recall-related information and transmits the information to the external network element. The external network element retrieves the automatic recall-related information from the service control point. The external network element may use the automatic recall-related information to provide enhanced services.

In an alternative embodiment, the switch may route an indication that a feature activation code has been dialed to the external network element before the external network element sends a request for the automatic recall-related information to the service control point.

It is an object of the present invention to provide a method and system for transmitting automatic recall-related information to an external network element so that enhanced services may be provided. Advantageously, the embodiments of the present invention provide an open interface to automatic recall-related information of an automatic recall service. The external network element may use the automatic recall-related information to provide enhanced services.

Other features and advantages of the present invention will be apparent to persons skilled in the art from the following detailed description of a preferred embodiment accompanied by the attached drawings wherein identical reference numerals refer to like parts and steps in the various views.

DETAILED DESCRIPTION

Figure 1:
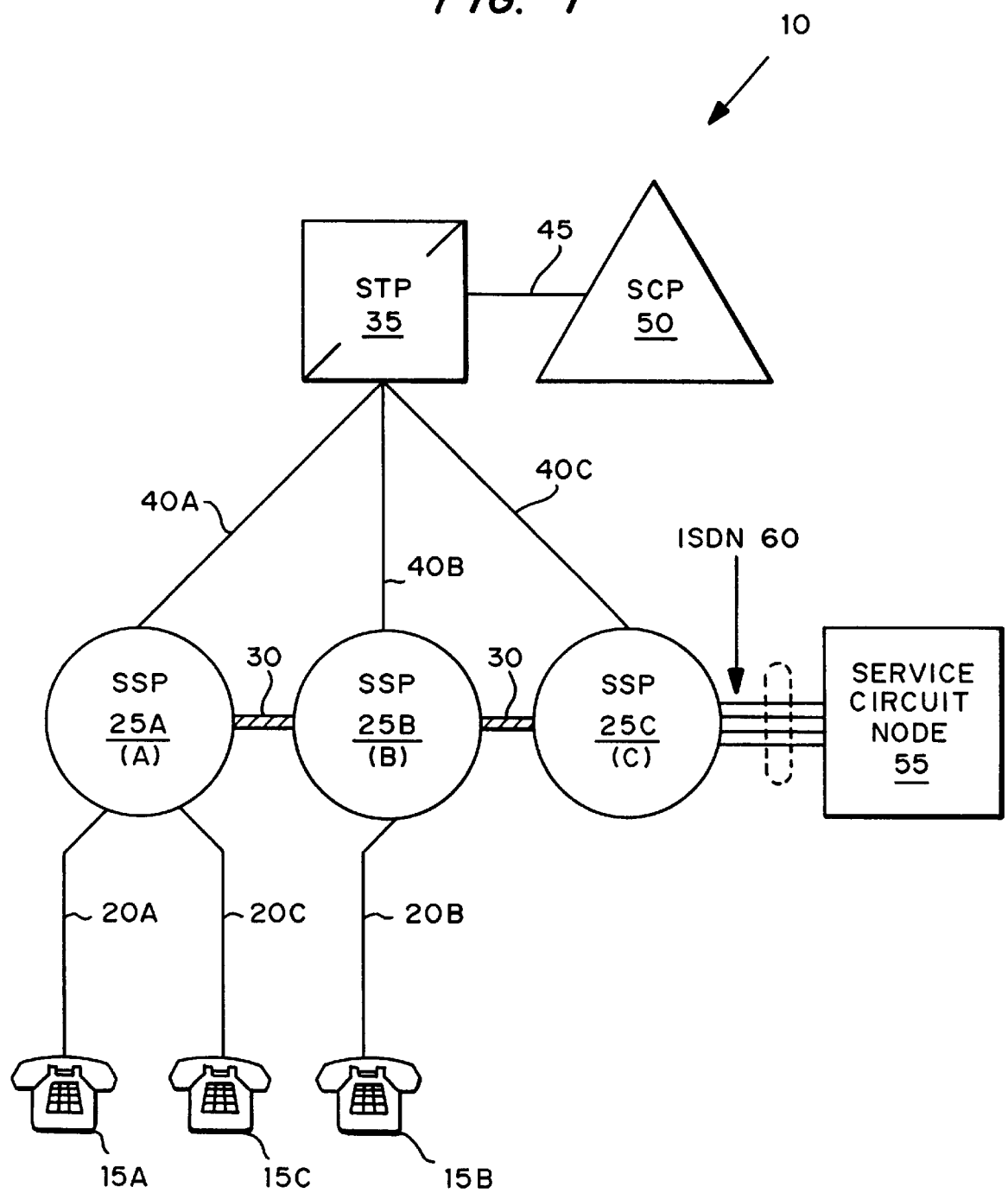
FIG. 1 is a block diagram illustrating the preferred environment for embodiments of the present invention.

This detailed description provides first a general description of the present invention, and then provides a description of the preferred environment (FIG. 1) for embodiments of the present invention. The detailed description concludes with a more particular description of the present invention through the use of flow charts describing exemplary embodiments (FIGS. 2 and 3) with reference to the preferred environment (FIG. 1).

Generally described, the present invention provides a method for transferring switch-based information to an external network element. For example, in one embodiment, the present invention is a method and system for transferring automatic recall-related information to a service control point (SCP) for storage and for providing the automatic recall-related information to a service circuit node to provide enhanced services. Automatic recall service, also known as call return or *69, allows a customer to dial a special feature code and receive an enunciation of the directory number of the last incoming caller. The customer is also typically presented with the option of calling back the directory number of the last incoming caller by dialing another special feature code. In a typical implementation of automatic recall service, automatic recall-related information is stored in a line history block of a switch associated with the directory number of the called party. The switch associated with the directory number of the called party may be referred to as the called party switch. Automatic recall-related information may include information such as the directory number of the last incoming caller, the time stamp of the last incoming call, and/or the privacy indicator of the last incoming call, along with other data. Automatic recall service is described in detail in the Background section.

Thus, in one embodiment, the present invention stores automatic recall-related information at an SCP. The automatic recall-related information may be transmitted from the SCP to an external network element, such as a service circuit node, to provide enhanced services, such as audible name enhancement. Audible name enhancement provides a voice enunciation of the name or other information associated with the directory number of the calling party.

Thus, it should be understood that the present invention generally provides an open interface to automatic recall-related information. Providing an open interface to automatic recall-related information generally refers to transferring the automatic recall-related information to an external network element. The term "external network element", or "terminating network element", is used herein to refer to any network element or application in the telecommunications network that is functionally connected to the SCP that stores the automatic recall-related information. An external network element may use the automatic recall-related information to provide enhanced services which the called party switch can not, or does not, provide, such as audible name enhancement.

Having generally described the present invention, a description of the preferred environment (FIG. 1) and operation of exemplary embodiments of the present invention therein are now provided. FIG. 1 is a block diagram illustrating a telecommunications network 10, and in particular, the typical interconnection of network elements such as may be present in the public switched telephone network (PSTN) and Advanced Intelligent Network (AIN) elements thereof. Additional information regarding the telecommunications network 10 may be obtained from the commonly assigned patent to Weisser, U.S. Pat. No. 5,430,719, which is incorporated by reference herein. The elements of FIG. 1 are used in FIGS. 2 and 3 to describe embodiments of the present invention.

Referring to FIG. 1, the present invention operates in connection with a communication placed by an originating caller using a terminating unit, such as unit 15a. The communication is routed in a conventional manner through the telecommunications network 10 to a terminating unit, such as unit 15b. Although telephones are illustrated as the terminating units in FIG. 1, those skilled in the art will understand that such units may include other telecommunications devices such as facsimile machines, computers, modems, etc.

As noted, one of the illustrated terminating units 15a is designated as corresponding to the originating caller (also referred to as "calling party", "caller", or "source"). Another of the terminating units 15b is designated as corresponding to the receiving party (also referred to as the "called party", "subscriber", or "destination"). Although an originating caller is generally referred to herein as a person, those skilled in the art will understand that an originating caller may be a device such as a facsimile machine, computer, modem, etc. Also as noted, the present invention operates in connection with a "communication". The term "communication" is used herein to include all messages known to those skilled in the art that may be exchanged between an originating caller and a network element, terminating unit, or person answering a call.

As further illustrated in FIG. 1, each of the terminating units 15a, 15b, and 15c is shown as connected by a respective subscriber line 20a, 20b, and 20c to a central office. Terminating units 15a and 15c are connected to central office (A) 25a and terminating unit 15b is connected to central office (B) 25b. Also shown is central office (C) 25c. These central offices are preferably SSP switches (also referred to as SSPs). SSP is an acronym for service switching point. Generally, an SSP includes intelligent network functionality including appropriate hardware and software so that, when a set of predetermined conditions are detected, the SSP initiates a trigger for a predetermined state of a call on a subscriber's directory number, generates the trigger as an appropriate message to be sent out over the telecommunications network, and suspends handling of a call until the SSP receives a reply from the network instructing the SSP to take certain action.

Still referring to FIG. 1, central offices 25a, 25b, and 25c are interconnected by a plurality of trunk circuits indicated as 30 in FIG. 1. These are the voice path trunks that interconnect the central offices to connect communications. As those skilled in the art will understand, each of the central offices 25a, 25b, and 25c is connected to a local signal transfer point (STP) 35 via respective data links 40a, 40b, and 40c. Also connected to STP 35 over data link 45 is the local service control point (SCP) 50. As is known to those skilled in the art, among the functions performed by SCPs is the maintenance of network databases which are used in providing services and, in particular, in providing enhanced telecommunications services. In addition, SCPs include databases that identify particular service subscribers and the services to be accorded to these subscribers. All of these network elements (SSPs, STPs and SCPs) operate pursuant to the well-known signaling protocol referred to as the Signaling System 7 (SS7) protocol.

In order to keep the processing of data and calls as simple as possible, a relatively small set of triggers is defined at the central offices for each call. A trigger in the Advanced Intelligent Network is an event associated with a particular subscriber line that generates a packet to be sent to an SCP. The trigger causes the SCP to query its database to determine which customized calling feature or enhanced service should be implemented for this particular call. The results of the database inquiry are sent back to the central office from SCP 50 through STP 35. The return packet includes instructions to the central office as to how to process the call. The instruction may be to take some special action as a result of a customized calling service or enhanced feature. In response to receiving the latter type message, the central office moves through its call states, collects the called digits, and generates further packets that are used to set up and route the call. Similar devices for routing calls among various local exchange carriers are provided by regional STPs (not shown) and regional SCPs (not shown).

The illustrated telecommunications network 10 also includes a terminating network element and, in particular, includes a service circuit node 55 as the terminating network element shown in FIG. 1. However, it should be understood that the terminating network element may also be a switch, an SCP, a computer, a node, as well as other terminating network elements known to those skilled in the art. Those skilled in the art will be familiar with these terminating network elements including service circuit nodes, which are generally implemented by the same types of computers that embody the service control point 50. In addition to the computing capability and database maintenance features, service circuit node 55 also includes voice and dual tone multifrequency (DTMF) signal recognition devices and voice synthesis devices. Service circuit node 55 may be connected to other telecommunication network elements as necessary or appropriate.

Service circuit nodes, such as service circuit node 55, are used principally when some enhanced feature or service is needed that requires an audio connection to the call or transfer of a significant amount of data to a caller over a switched connection during or following a call. As shown in FIG. 1, service circuit node 55 is typically connected to one or more (but normally only a few) central offices via an Integrated Service Digital Network (ISDN) interface connection such as the connection 60 between service circuit node 55 and central office C 25c. Preferably, this ISDN interface connection 60 constitutes ISDN basic rate interface (BRI) lines. Thus, a service circuit node may be viewed as a smart termination connected to an ISDN interface connection that may be used to provide enhanced or special services. Having generally described the preferred environment in which the present invention is implemented, an exemplary embodiment of the present invention will be described below in reference to FIG. 2.

Figure 2:
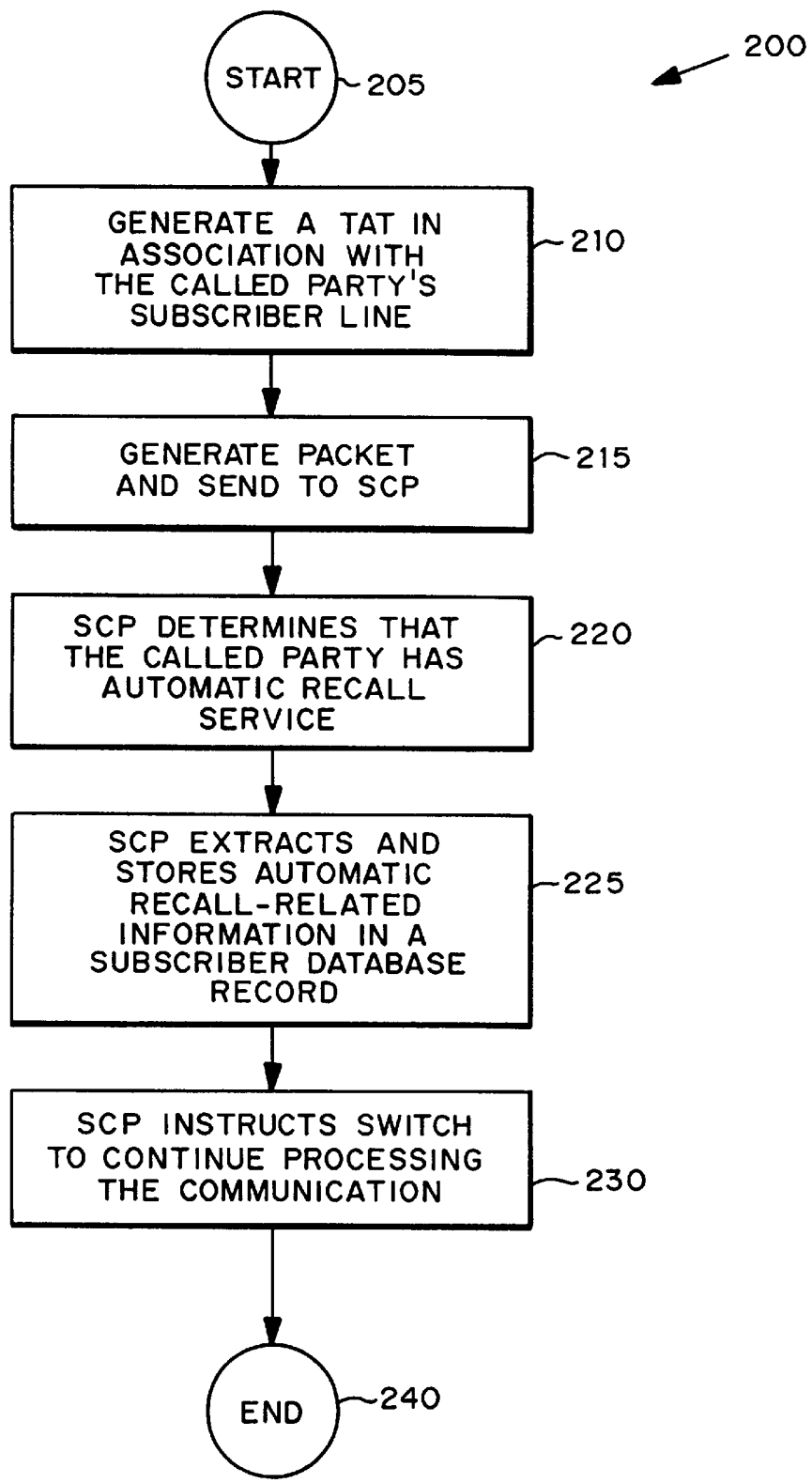
FIG. 2 is a flow chart illustrating a method for storing automatic recall-related information in an SCP in accordance with an exemplary embodiment of the present invention.

A flow chart illustrating a method 200 for storing automatic recall-related information in an SCP in accordance with an embodiment of the present invention is provided in FIG. 2 with reference to the telecommunications network 10 of FIG. 1. Prior to the performance of method 200, the following events generally occur in telecommunications network 10. Referring to FIG. 1, an originating caller places a communication to a called party's directory number. The communication is routed in a conventional fashion over a voice path connection from originating unit 15a to its serving central office 25a. The communication is further routed in a conventional fashion over a voice path connection from central office 25a through the network 10 as necessary to the central office 25b serving the called party's unit 15b. For this communication example, central office 25b will also be referred to as called party switch 25b.

Referring now to FIG. 2, the method 200 begins at step 205 and proceeds to step 210 when the called party does not answer the communication from the called party or when the called party's line is busy. A termination attempt trigger (TAT) is generated at the called party switch 25b in association with the called party's subscriber line 20b at step 210. As described above, a trigger in the Advanced Intelligent Network is an event associated with a particular subscriber line that generates a packet to be sent to an SCP. The method then proceeds to step 215.

At step 215, a packet is generated and sent to the SCP 50. At step 220, the SCP 50, using the information contained in the packet, determines that the called party has automatic recall service. At step 225, the SCP extracts the automatic recall-related information from the packet and stores it in a subscriber's database record at the SCP.

At step 230, the SCP 50 sends a return packet to the called party switch 25b. The return packet requests that the called party switch 25b continue processing the communication. The method then ends at step 240. Automatic recall-related data is now available at the SCP and is stored in the subscriber's database record for future retrieval by an external system.

It should be understood that the automatic recall-related information for any number of callers may be stored at the SCP. Thus, multi-caller logging is facilitated using the present invention because information for more than simply the last incoming caller may be stored. For example, under multi-caller logging, automatic recall-related information for each communication that goes unanswered or that results in a busy signal is stored at the SCP. The subscriber may then receive an audible listing of the incoming callers and return a call to one of them.

Having described an exemplary embodiment of the present invention for storing automatic recall-related information in an SCP in reference to FIG. 2, an exemplary embodiment of the present invention providing the automatic recall-related information to a service node for enhanced services is described below with reference to FIG. 3.

Figure 3:
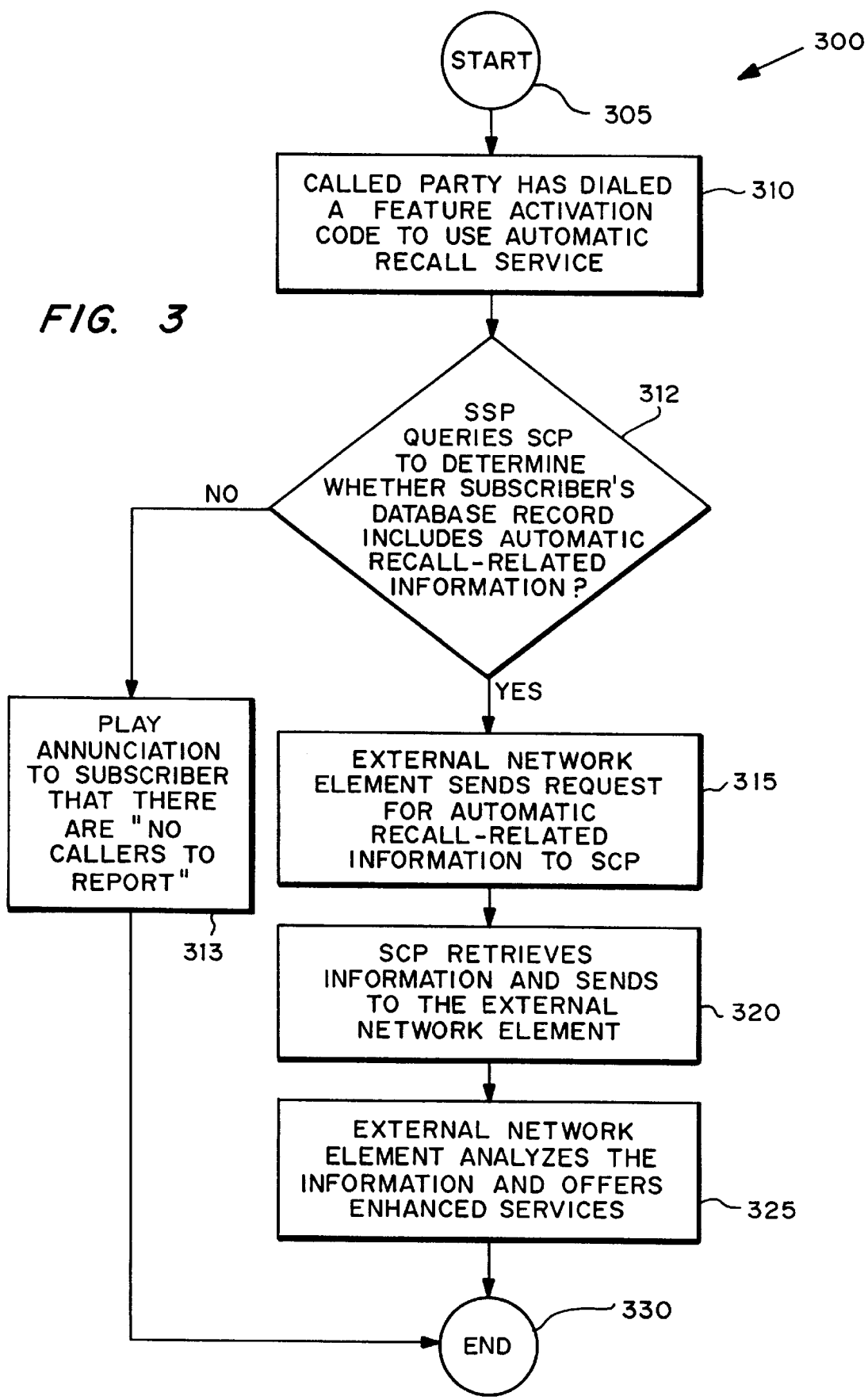
FIG. 3 is a flow chart illustrating a method for providing automatic recall-related information to an external network element in accordance with an exemplary embodiment of the present invention.

Referring now to FIG. 3, the method 300 begins at step 305 and proceeds to step 310 when the called party switch 25b receives an indication that the called party has dialed a feature activation code on the keypad of called party's unit 15b. The feature activation code may be *69 or another feature activation code. Feature activation codes are well-known to those skilled in the art.

At decision step 312, the called party switch 25b launches a query to the SCP to determine if there is automatic recall-related information stored in the subscriber's database record. If, at decision step 312, it is determined that there is no automatic recall-related information stored in the subscriber's database record, then the method proceeds to step 313. At step 313, an annunciation is played to the subscriber, such as "No callers to report", informing the subscriber that there is no automatic recall-related information stored in the subscriber's database record. The method then ends at step 330.

However, if at decision step 312, it is determined that there is automatic recall-related information stored in the subscriber's database record, then the method proceeds to step 315. At step 315, the service circuit node 55 sends a request to the SCP 50 requesting the automatic recall-related information associated with the directory number of the called party. At step 320, the SCP 50 retrieves the automatic recall-related information associated with the directory number of the called party and sends the automatic recall-related information to the service circuit node 55. The method then proceeds to step 325.

At step 325, the service circuit node 55 analyzes the automatic recall-related information. After analyzing the automatic recall-related information, the service circuit node may offer service selections to the called party. For example, the called party may request that the service circuit node enunciate the automatic recall-related information for all of the previous callers. The called party may also request that the service circuit node automatically return a call to any number on the list.

The method then ends at step 330.

It should be understood that the external network element may use the automatic recall-related information to perform enhanced services in a conventional manner after retrieving the information from the SCP. For example, the service circuit node 55 may provide the called party with a voice enunciation of the calling party's name, such as "Your last call was from Dale Malik at 12:04 PM on Monday, May 4. Please press '1' on your key pad to automatically dial this number." In the past, this voice enunciation of the last caller's name was impossible because the service circuit node 55 could not access automatic recall-related information such as the directory number of the originating unit 15a. However, using the present invention, the automatic recall-related information may be sent from the SCP to the service circuit node or another external network element so that an enhanced service may be provided using this information.

It should be understood that many different enhanced services may be provided using the present invention. Generally, any enhanced service which uses automatic recall-related information may be performed with the present invention. For example, the present invention may be used to send a voicemail message to the last incoming caller. As another example, if the directory number of the last incoming caller is busy, then the present invention may be used to call the called party when the directory number of the last incoming caller is no longer busy. As will be understood by those skilled in the art, a variety of different enhanced services may be performed using the automatic-recall related information.

It should be understood by those skilled in the art that embodiments of this invention will work with all devices, such as cellular telephones, that have SS7 capabilities. It should be further understood that, although the terminating network element, or external network element, has been described herein as a service circuit node, the terminating network element may be any network element with the features described above.

It should still be further understood that the present invention may be used with automatic recall-related information or any other switch-cased information, i.e., information stored in a switch. Any information stored in a switch may be delivered and stored in an SCP. The information may, based on a feature activation code, be delivered from the SCP to any external network element.

The present invention is an improvement upon the prior art automatic recall services. The present invention uniquely stores automatic recall-related information in an SCP and allows external network elements access to the automatic recall-related information. The external network element may provide enhanced services that the called party switch can not, or does not, provide.

Given the foregoing disclosure of the preferred embodiment and design parameters for the present invention, other embodiments of the present invention will suggest themselves to those skilled in the art. Therefore, the scope of the present invention is to be limited only by the claims below.

I claim:

1. In a telecommunications network including a switch functionally connected to a service control point (SCP), a method for storing automatic recall-related information in said SCP, said method comprising:

generating a packet indicating that a communication in association with a subscriber line functionally connected to said switch has gone unanswered;

sending said packet to said SCP;

in response to receiving said packet, causing said SCP to extract said automatic recall-related information from said packet; and storing a directory number of a first subscriber terminal unit, a time stamp of said communication, and a privacy indicator of said automatic recall-related information of said communication at said SCP.

2. In a telecommunications network including an external network element functionally connected to a switch and to a service control point (SCP), a method for providing automatic recall-related information stored in said SCP to said external network element, said method comprising:

causing said external network element to send a request for said automatic recall-related information to said service control point, said automatic recall-related information comprising a directory number of a first subscriber terminal unit, a time stamp of a communication, and a privacy indicator of a communication; and in response to said request, causing said service control point to retrieve said automatic recall-related information and to transmit said information to said external network element.

3. The method recited in claim 2, further comprising the step of causing said switch to route an indication that a feature activation code has been dialed to said external network element before said step of causing said external network element to send a request for said automatic recall-related information to said service control point.

4. In a telecommunications network including an external network element, a service switching point, and a service control point, a method for providing said external network element with access to automatic recall-related information stored in said service control point, said method comprising:

with respect to an unanswered communication from a terminal unit to a subscriber, storing a directory number of said terminal unit, a time stamp of said communication, and a privacy indicator of said automatic recall-related information of said communication at said service control point;

in response to an indication from the subscriber, causing said external network element to send a request for said automatic recall-related information to said service control point;

in response to said request, causing said service control point to retrieve said automatic recall-related information and to transmit said information to said external network element.

* * * * *